May 12, 1953        H. F. GEORGE        2,638,377
ADJUSTABLE EYE SHIELD FOR PROTECTION AGAINST LIGHT GLARE
Filed Dec. 15, 1949        3 Sheets-Sheet 1
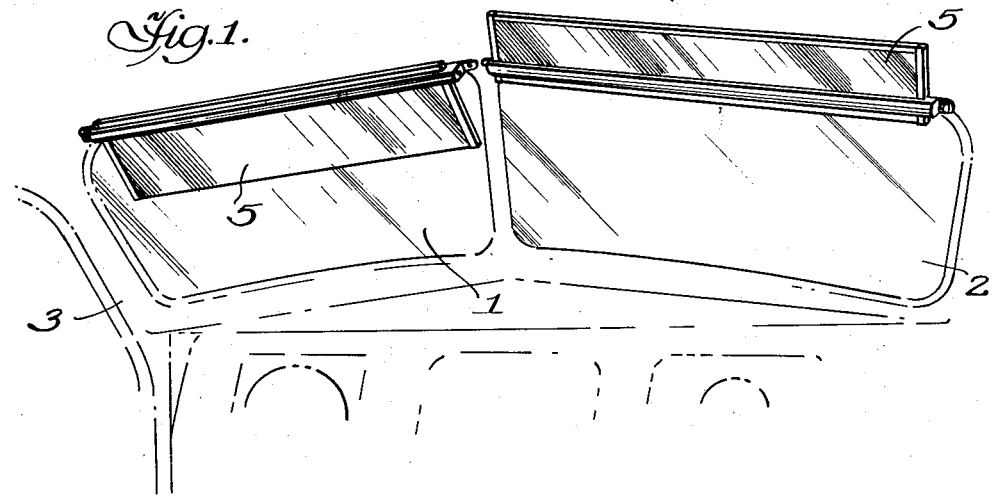
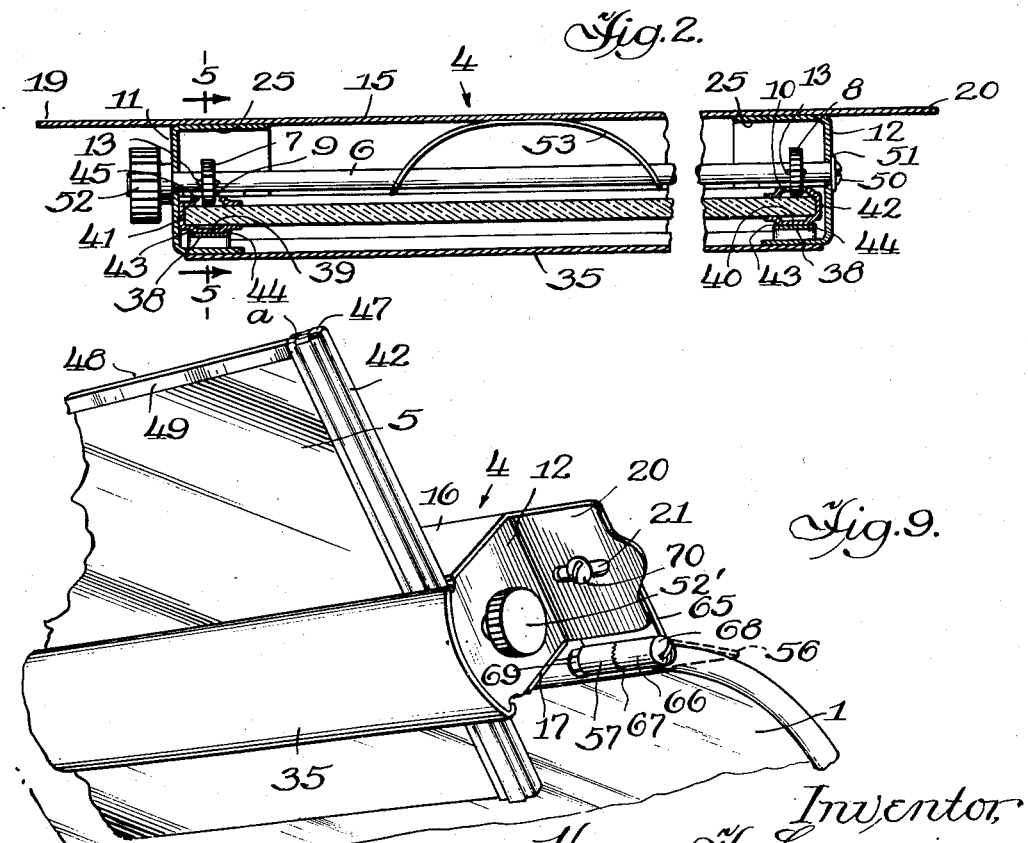
Inventor,
Harry F. George
By Frederick F. Mason Atty

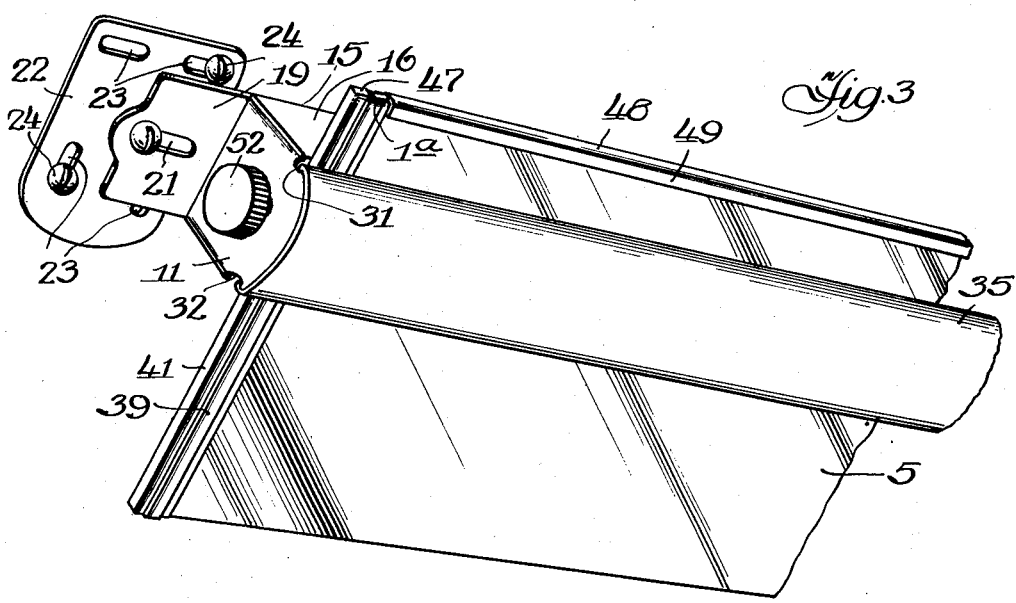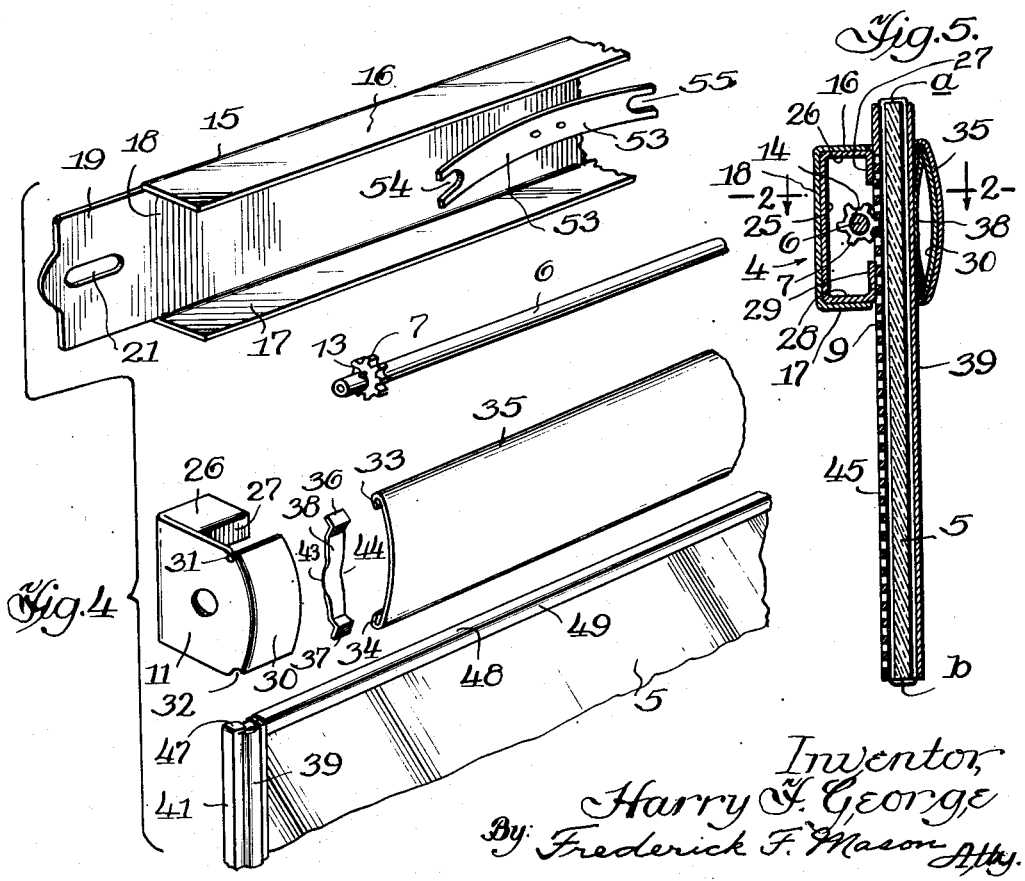

May 12, 1953 H. F. GEORGE 2,638,377
ADJUSTABLE EYE SHIELD FOR PROTECTION AGAINST LIGHT GLARE
Filed Dec. 15, 1949 3 Sheets-Sheet 3
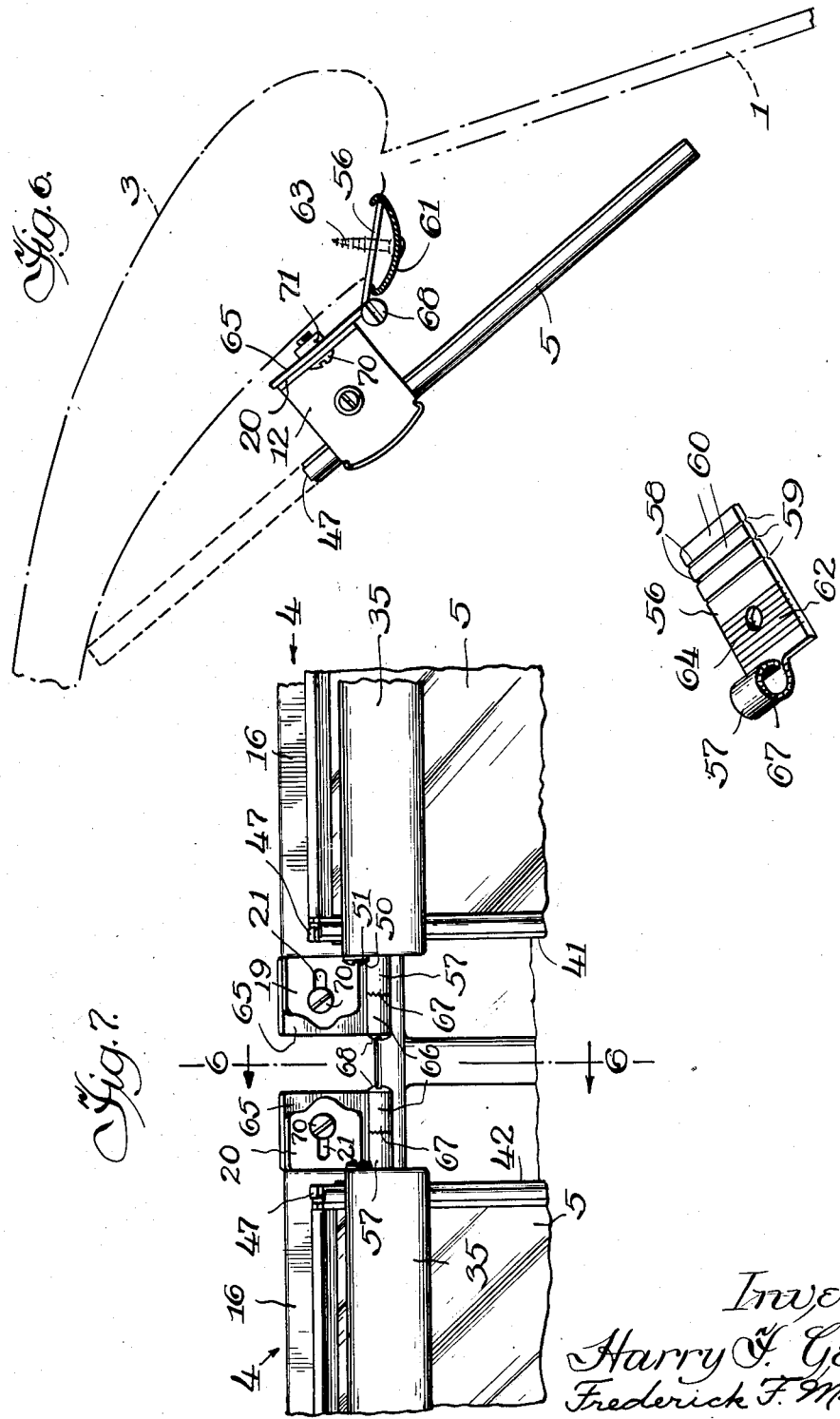
Inventor
Harry F. George
Frederick F. Mason Atty Patented May 12, 1953

2,638,377

UNITED STATES PATENT OFFICE 2,638,377

ADJUSTABLE EYE SHIELD FOR PROTECTION AGAINST LIGHT GLARE

Harry F. George, Chicago, Ill.

Application December 15, 1949, Serial No. 133,097

3 Claims. (Cl. 296—97)

This invention relates to an adjustable eye shield for protection against light glare, and more particularly to such shields for use in automotive transportation conveyances such as land vehicles, boats, air transportation, and the like.

As is well known, light glare, whether directly from the source of light or from reflection, is dangerous and annoying as well as harmful and fatiguing to the eyes of the observer. While not limited thereto, one illustration is found in the driving of an automobile along a highway where a light glare is encountered from the sun or from a strong light in front of, or approaching, the vehicle. In such, and other instances, the operator of the vehicle is oftentimes suddenly confronted with a light glare which may be dangerous because he will become temporarily partially blinded and confused so as not to be able to safely drive the vehicle, resulting in a crash and possible loss of life. Also the annoyance of such glare is extremely uncomfortable, and fatiguing to the operator's eyes, as well as to the eyes of other occupants of the vehicle.

In the present invention the above disadvantages and dangers have been overcome, by the provision of an adjustable eye shield attached to the vehicle in front of the operator's eyes, or occupant's eyes, which shield is so constructed as to be quickly and easily adjusted to safely and comfortably subdue such light glare on short notice, as well as to remove the shield from the line of vision when not required.

Among the objects of my invention are: to provide a new and improved eye shield for protection against light glare; to provide an eye shield that may be readily installed in an automotive transportation conveyance, and be quickly and easily adjusted to fit varying situations; to provide an eye shield having new and improved means for adjusting the transparent portion for varying degrees of movement edgewise; to provide an eye shield having rotatable mechanical means for adjusting a transparent vision panel edgewise, and friction means for enabling the panel to be manually and instantly adjusted edgewise regardless of the mechanical adjusting means; to provide an eye shield having a transparent vision panel that is non-breakable and non-shatterable; to provide an eye shield that is adjustable edgewise in a slotted frame, and with its two side edges moving at the same speed with relation to each other without cramping; to provide novel means for holding the vision panel against slipping in its slotted frame after being adjusted edgewise therein; to provide an eye shield that is economical to manufacture, efficient in operation, always available for instant edgewise adjustment, and attractive in appearance; and such further objects, advantages and capabilities, inherently possessed by my invention, as will later more fully appear.

My invention further resides in the combination, construction, and arrangement of parts illustrated in the accompanying drawings, and while I have shown therein a preferred embodiment, I wish it understood that the same is susceptible of modification and change without departing from the spirit of my invention.

In the drawings:

Fig. 1 is a perspective view of a pair of my eye shields as applied to the wind shield of an automobile, or the like, the latter being shown fragmentarily and the two eye shields in different positions of adjustment.

Fig. 2 is an enlarged, longitudinal section, partly broken away, through one of the eye shields, and taken on the line 2—2 of Fig. 5.

Fig. 3 is an enlarged, fragmentary, perspective view looking at an angle toward the outer end of one of the eye shields, and showing one of the supporting plates.

Fig. 4 is a fragmentary, exploded, perspective view of one of the eye shields, and showing the parts in separated position for a clearer understanding of how they will be assembled together.

Fig. 5 is a transverse section on the line 5—5 of Fig. 2.

Fig. 6 is a side edge elevation of one of the eye shields looking from the line 6—6 of Fig. 7, and showing modified means for mounting the same on the vehicle or conveyance, the latter being shown fragmentarily in broken lines, and the upper adjustment of the vision panel being shown in dotted lines.

Fig. 7 is a fragmentary view of two of the eye shields looking toward the left-hand side of Fig. 6.

Fig. 8 is a perspective view of one of the stationary hinge members to be secured to the vehicle or conveyance and receive similar hinge members secured to the eye shields, for supporting the eye shields on the conveyance.

Fig. 9 is an enlarged, fragmentary, perspective view, looking at an angle toward the inner end of one of the eye shields mounted on the vehicle or conveyance by the hinge support means of Figs. 6-8.

While I have shown, for illustrative purposes, my invention as applied to be positioned behind the wind shield of an automotive conveyance, such as an automobile, boat, airplane, or the like, I wish it understood that it may be used in any other connection to which it may be adaptable.

The term "automotive conveyance" is accordingly used herein with that interpretation. Any number of eye shields embodying the present invention, may be used as desired, depending upon the length of the light opening, window, or the like. In Fig. 1, two of these eye shields are shown applied one to each of two wind shield panels 1 and 2 of an automotive conveyance 3, only a fragment of the latter being shown for convenience.

The present eye shields, which as will be understood from the foregoing are for protecting the eyes of anyone behind them from light glare, comprise generally a narrow elongated frame 4, and a vision panel 5 movable edgewise in a slot or opening in the frame by means of a shaft 6 having a pair of laterally spaced pinions or gears 7 and 8, meshing with racks 9 and 10 respectively, which racks are preferably fixed to extend along the same side face (preferably the rear face) of the vision panel 5 adjacent the end edges thereof. The shaft is rotatably journaled at, or adjacent, its ends in aligned openings in the frame end plates 11 and 12. The gears 7 and 8 are each fixed to the shaft 6, to rotate therewith, in any desired manner, as for example by a projection 13 on the shaft to seat in a key-seat 14, or by other means suitable to the purpose.

The frame 4 comprises a back plate or channel member 15, formed along its top and bottom edges with forwardly extending flanges 16 and 17 which at both ends stop short of the ends of the web 18, so as to form extensions (one at each end) 19 and 20, each of which is formed with an elongated opening 21 to adjustably receive a screw, bolt or the like, for securing the eye shield to a supporting bracket, hinge, or the like, secured to an adjacent surface of the automotive conveyance. In the form shown in Fig. 3 such bracket is indicated at 22 and is formed with a plurality of elongated openings 23, some of which extend in an up and down direction, and some in a cross-wise direction, to afford greater adjustment when screws, bolts, or the like 24 are passed therethrough and secured to the material of the conveyance adjacent the wind shield. As will be understood, when these brackets 22 are used, there will be one at each end of the eye shield, or the one in the middle of two windshield panels may be of modified form as the conditions of installation may require.

The frame end plates 11 and 12 are each provided with inwardly extending flanges, to form end members or mounting heads, and as these mounting heads are of similar construction only one of them will be described in detail. Referring to Figs. 2, 4 and 5, the end plate 11 (and 12 at the other end, see Fig. 2) is formed along its rear edge with an inwardly extending flange 25, secured by spot welding or other suitable means to the inner surface of the channel member web 18 in such position that the adjacent end edges of the channel member flanges 16 and 17 will be in substantially the same plane as that of the outer face of the end plate (11 or 12), see Figs. 3 and 9. Flange 25 is stamped from sheet metal integrally with the end plate (11 or 12) so as to have upwardly and downwardly extending ears or extensions, the upper one of which is bent forwardly to form the flange 26 and then downwardly to form the flange 27, while the bottom extension is bent forwardly to form the flange 28 and then bent upwardly to form the flange 29. Flanges 27 and 29 are in a common plane spaced inwardly from and parallel with the back flange 25 (see Fig. 5). Flanges 25—29 are preferably of equal length longitudinally of the shaft as will be understood in Figs. 2 and 4, and have a space therebetween so that the gear may contact the rack.

End plate 11 (and 12) at its forward edge is bent inwardly to form a curved flange 30 and at its top and bottom edges closely adjacent flange 30 is formed with recesses 31 and 32 to receive the ends of bent under lips 33 and 34, respectively, formed to extend along the top and bottom edges of the curved and elongated front plate 35. Plate 35 is of a length so that its end edges will fall approximately in the same planes respectively as the outer surfaces of the end plates 11 and 12 when the parts are assembled in final position. During such assembly the bent under lips 33 and 34 will be slid over the top and bottom edges respectively of the front flange 30 of one of the mounting heads and somewhat beyond normal position, so that the other end of the front plate 35 will clear the inner edge of the front flange 30 of the other mounting head. The front plate is then moved rearwardly a slight distance until its bent under lips 33 and 34 are respectively in alinement with the upper and lower edges of the front flange 30 of said other mounting head. The front plate is then slid in the opposite direction to bring its ends even with the outer faces of end plates 11 and 12.

When the end portions of the bent under ears 33 and 34 are being placed over the top and bottom edges of the front flange 30 of the respective mounting heads, the top and bottom ends 36 and 37 of a leaf spring member 38 (one for each mounting head) are positioned under said bent under lips inside of flange 30, so that when the front plate 35 is in its final position the ends of said spring member 38 will be gripped between the upper and lower edge portions of the front flanges 30 and the bent under portions of said lips, as seen in Fig. 5. The two leaf springs 38 are bowed inwardly to resiliently bear against the outwardly embossed flanges 39 and 40 of the respective molding strips 41 and 42 secured to embrace the two side edges of the vision panel 5. As seen in Figs. 2 and 4, the middle portion of the length of each of springs 38 is bent inwardly along its edges 43 and 44 to form a seat to respectively receive said embossed portion of flanges 39 and 40 of molding strips 41 and 42, to hold these springs in position thereon when the bent under lips of the front plate are being slid over the ends of these springs.

The two racks 9 and 10 are respectively formed in the embossed portions of the inner flanges 45 and 46 of the molding strips 41 and 42. These elongated embossed portions of flanges 45 and 46 are each formed with a series of openings to form the rack teeth and also provide ample space for the operation of the gear teeth therein. It is thus seen that the molding strips are tightly gripped over the side edges of the vision panel to provide ample spacing for the efficient functioning of the parts. To further prevent slipping of the molding strips 41 and 42 on the transparent plate of the vision panel, the ends of the outer edge portions of these strips are bent inwardly to extend for a short distance over the top and bottom edges of the transparent plate to form stops 47 as seen in Figs. 3, 4, 6, 7 and 9. Extending along the top edge of the transparent plate of the vision panel between the inner edges of the flanges 39, 40, 45 and 46 of the molding strips is a top protecting strip 48 having side flanges 49 (one on each side) gripping the opposite side faces of the top edge of the transparent plate. To further grip the transparent plate the inner edge portions of the molding strip flanges 39, 40, 45 and 46 that contact the plate, are at their ends bent over the top and bottom edges of the plate, as seen at a and b in Fig. 5.

As viewed in Fig. 2, the right-hand end of shaft 6 extends through the hole forming the journal in end plate 12 a distance so that its end is slightly more than flush with the outer face of this end plate to receive a headed screw 50 with a marginal flange 51 of larger diameter than the journal hole in the end plate 12 to hold the shaft against endwise movement to the left. If desired the marginal flange 51 may be a washer for a like purpose. The left-hand end of shaft 6, as viewed in Fig. 2, extends through a journal hole in end plate 11 a sufficient distance to have fixed thereto a knob or handle 52, the hub of which loosely contacts the end plate 11 to hold the shaft against endwise movement to the right. This construction prevents undue end play of the shaft and yet permits rotation thereof. If it is desired that the shaft 6 have a knob or handle at both ends, the right-hand end of the shaft of Fig. 2 may be extended also, provided with such knob or handle 52' as shown in Fig. 9, and similar in construction to the knob 52 shown in Fig. 2.

While springs 38 apply frictional braking action to the vision panel sufficient to prevent the panel from unduly slipping in the frame and hold it in any of its adjusted positions, such frictional resistance may also be applied to the shaft 6, by a bowed spring 53 fixed by spot welding, pins, or other suitable fastening means at its mid-position to the web 18 of the channel-shaped back plate 15. This spring has its opposite end portions bowed inwardly and has recesses 54 and 55 formed in its ends, each of which straddles the shaft at spaced locations and bears frictionally thereagainst. Bowed spring 53, in addition to adding frictional resistance to rotation of the shaft, also prevents rattling of the parts during operation.

As shown in Figs. 6–9, instead of mounting the eye shield on the conveyance by means of brackets 22, I may use for each eye shield two pairs of hinge members, one pair at each end and comprising one relatively stationary hinge member fixed to the conveyance, and one movable hinge member fixed to the eye shield, these two hinge members of each pair being swingably connected together with a hinge pin, and arranged to be relatively adjusted and then fixed against movement. In this construction the stationary hinge member 56 is formed with an upwardly curved cylindrical eyelet member 57 one-half the width of the hinge plate and integrally formed therewith at one end, and a plurality of laterally extending grooves 58 and 59 on the two sides of the plate at the other end portion, these grooves registering in pairs so that one or more of the sections 60 may be broken or cut off as desired to selectively shorten the length of the hinge plate to fit different widths of moldings 61, or requirements for different lengths of hinge plates in different installations. As seen in Fig. 8, the hinge plate 56 is roughened on one face at 62 (or both faces if desired) to more firmly grip the hinge plate between the molding 61 and the adjacent portion of the conveyance, (see Fig. 6) when the screws 63 are tightened. The screws 63 will preferably be located outside of the area of the stationary hinge plates 56, although, if desired, they may be passed through holes 64 in the hinge plates 56.

The adjustable hinge plate 65 is a duplicate of the stationary hinge plate 56, and when applied to the rear face of one or the other of the extensions 19 and 20 of the channel member 15 it is turned in the same plane through 180° with relation to the position of the stationary hinge plate 56 shown in Fig. 8, so as to position its cylindrical pin-receiving eyelet 66 in alinement with eyelet 57 and in juxtaposition therewith. The two contacting end faces of eyelets 57 and 66 are roughened as seen at 67 in Figs. 7, 8 and 9. This enables loosening the fulcrum pin of the pair of hinge plates by slightly unscrewing the slotted head 68 or loosening the nut 69 of the fulcrum pin to free the roughened surfaces 67 and adjust the eye shield any desired rotational amount to properly position the same. When positioned as desired the fulcrum pin may be again tightened to lock the two hinge members firmly together until further adjustment is desired. As will be understood in Fig. 6, the adjustable hinge plate 65 is fixed to one or the other of the extensions 19 and 20 of the channel member 15 by a headed screw 70 passing through slot 21, and tightened by nut 71, or any other suitable arrangement desired.

As viewed in Fig. 6, the vision panel 5 may be lowered to operative position as shown in solid lines, or elevated to inoperative position as shown in dotted lines. This movement of the vision panel may be effected either by rotating the knob 52 or 52' in the desired direction to cause movement of the racks by the two gears, or by pushing upwardly or downwardly on the vision panel manually. Due to the two gears 7 and 8 being of the same size and being fixed to rotate with shaft 6, a push upwardly or downwardly on the panel, at any portion of its length, will cause both of its side edges to move in a corresponding direction at the same speeds without cramping. The same is also true of operation of the vision panel by either of the operating knobs 52 and 52'. This manual operation of the panel enables a quick and satisfactory operation thereof by a flip or quick push thereagainst by the operator's fingers, to meet sudden emergencies, either from the sun's rays, or from an oncoming glare headlight, or any other source.

The transparent plate of the vision panel 5, may be made of any of the well known anti-glare materials obtainable on the market. These are generally formed of sheet plastic materials, so made or treated that they will kill light glare and enable the observer to look therethrough directly at the sun, or at an oncoming glare headlight, or other sources of strong light, without discomfort, and at the same time clearly observe objects for safe driving, or for other purposes. Some of these materials are purchasable on the market under various names, such as "Plexiglas," "Lucite," "Polaroid," sun glass, and other names. While a plastic anti-glare material is preferred because of its being nonbreakable and non-shatterable, I do not wish to be limited thereto, as glass and other transparent materials, treated to eliminate light glare, may be used without departing from the spirit of the present invention.

While the invention is not limited to these particular dimensions, I have had very satisfactory results by using transparent anti-glare plates of $\frac{3}{16}$ inch thickness, 6½ inches width, and 22½ inches length. As is obvious, other dimensions may be used as desired. Also, if desired, the front plate 35 may be omitted to expose for use almost the entire area of the transparent plate of the vision panel, in which case any suitable means may be employed for holding the springs 38 in place behind flanges 30. In any event, the spacing of flanges 30 from the alined two pairs of flanges 27 and 29, forms a pair of opposed open ended recesses to slidably receive the side edges of the vision panel.

Having described my invention, I claim:

1. An eye shield adapted to be mounted behind the wind shield of an automotive conveyance, for protecting against light glare, comprising, an elongated back plate having forwardly extending top and bottom flanges forming a channel, an end member secured to each of the ends of the back plate, each of the end members having longitudinally extending back, top and bottom flanges extending into the channel of the back plate and a longitudinally extending front flange laterally outside of said channel and spaced forwardly of said end member top and bottom flanges to form a slot open at its inner end, an anti-glare vision panel having its end edges slidable in said open ended slots, and means for moving said panel edgewise through said slots.

2. An eye shield adapted to be mounted behind the wind shield of an automotive conveyance for protecting against light glare, comprising, an elongated channel member, a pair of end members secured one to each of the end portions of said channel member, a front plate secured at its ends to said end members to extend therebetween, an anti-glare vision panel mounted for edgewise sliding movement behind said front plate and in front of said channel member, each of said end members being formed with an inwardly extending flange to which flanges said front plate is detachably secured, and a friction spring between each of said flanges and the panel to yieldably hold the panel in various positions of edgewise adjustment.

3. In a glare shield for protecting against light glare, an axle, an end member mounted on each of the end portions of the axle, each of said end members having a pair of laterally spaced, longitudinally and inwardly extending flanges, each of said end members having on each side edge near one end a recess, a plate extending between said end members, said plate having on each of its longitudinal edges a curled portion each of which is seated in one of said recesses in each of said end members, an anti-glare vision panel having secured along each of its side edges a U-shaped reinforcing member providing integral supporting strips on the opposite faces of the vision panel, said U-shaped members being positioned one in each of the spaces between said laterally spaced flanges for sliding movement therein in straight lines, one of said strips of each of the U-shaped members having gear-teeth-receiving openings therein and the other forming a sliding member to contact and slide along the adjacent flange of the respective end members, gears on said shaft engaging said openings for controlling equal movement of the two side edges of the panel, said vision panel being rigid and always movable in a single plane with relation to said end members.

HARRY F. GEORGE.

References Cited in the file of this patent

UNITED STATES PATENTS

| Number | Name | Date |
|---|---|---|
| 1,325,790 | Kleinschmidt | Dec. 23, 1919 |
| 1,813,881 | Peters | July 7, 1931 |
| 2,160,099 | Zeligman et al. | May 30, 1939 |
| 2,228,209 | Harrington | Jan. 7, 1941 |
| 2,279,542 | Westrope | Apr. 14, 1942 |
| 2,279,648 | Westrope | Apr. 14, 1942 |
| 2,358,173 | McFadyen | Sept. 12, 1944 |
| 2,422,863 | Stroth | June 24, 1947 |